United States Patent [19]

Brusasco

[11] Patent Number: 4,766,985
[45] Date of Patent: Aug. 30, 1988

[54] POWER CLUTCH SYSTEM

[75] Inventor: Enzo Brusasco, Turin, Italy

[73] Assignee: Roltra S.p.A., Turin, Italy

[21] Appl. No.: 15,072

[22] Filed: Feb. 17, 1987

[30] Foreign Application Priority Data

Feb. 21, 1986 [IT] Italy .............................. 53014/86[U]

[51] Int. Cl.[4] ............................................. F16D 23/00
[52] U.S. Cl. ............................. 192/0.02 R; 192/84 R; 192/90; 318/488
[58] Field of Search .................. 192/0.02 R, 84 R, 90; 318/646, 488; 188/156, 157, 106 R, 106 P

[56] References Cited

U.S. PATENT DOCUMENTS

| | | | |
|---|---|---|---|
| 1,989,672 | 2/1935 | Apple | 188/156 |
| 1,998,918 | 4/1935 | Apple et al. | 188/156 |
| 4,415,054 | 11/1983 | Drutchas | 192/0.02 R |
| 4,648,498 | 3/1987 | Herbulot et al. | 192/84 R |
| 4,658,939 | 4/1987 | Kircher et al. | 188/156 |

FOREIGN PATENT DOCUMENTS 2041481 9/1980 United Kingdom ........... 192/0.02 R

Primary Examiner—Leslie A. Braun
Assistant Examiner—David A. Testardi
Attorney, Agent, or Firm—Shlesinger, Arkwright & Garvey

[57] ABSTRACT

A vehicle power clutch system, whereby a clutch device is provided with a control lever designed to move between two operating positions, corresponding respectively to engagement and release, by virtue of an axially-mobile control member; at least a portion of the control member consisting of a screw connected, via the interposition of balls, to a nut screw integral with a hollow shaft on an electric motor, through which hollow shaft the control member itself extends; the electric motor being controlled by a threshold comparator, an input of which is connected to the electric output of a device for measuring axial tensile or compressive stress and located along the aforementioned control member.

8 Claims, 1 Drawing Sheet

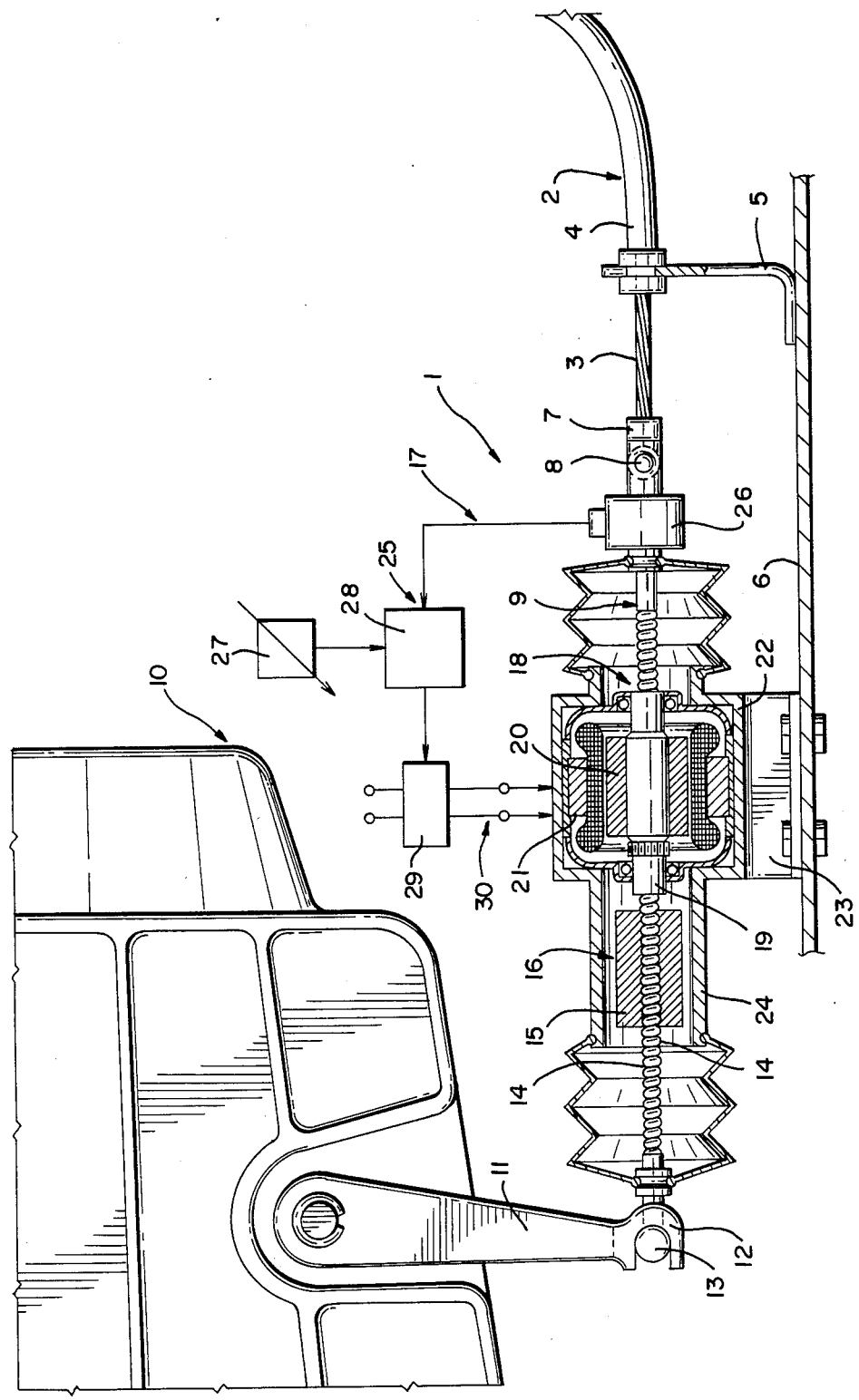

4,766,985

POWER CLUTCH SYSTEM

BACKGROUND OF THE INVENTION

The present invention relates to a power clutch system for vehicles, particularly motor vehicles.

Vehicles in general, and motor vehicles in particular, are known to be fitted with clutch systems located between the engine and the drive, which systems are usually controlled by means of a pedal and comprise an interlocking system for maintaining, within given limits, the pressure exerted by the user on the pedal for releasing a clutch device normally maintained in the engaged or drive position by means of a series of springs.

The interlock is usually formed by means of a hydraulic circuit, which usually comprises a hydraulic pressure system and is therefore relatively complex, expensive and unreliable.

SUMMARY OF THE INVENTION

The aim of the present invention is to provide a power clutch system not requiring a hydraulic interlocking circuit, and which is relatively straightforward and cheap to produce.

With this aim in view, according to the present invention, there is provided a power clutch system for vehicles, in particular motor vehicles, comprising a clutch device having a control lever designed to move between two operating positions corresponding respectively to engagement and release; a control member connected to the lever and designed to move back and forth axially for moving the lever between the two operating positions; and a power drive unit connected to the control member; characterised by the fact that the power drive unit comprises an electric motor with a hollow shaft; a screw-nut screw coupling on which the nut screw is integral with the hollow shaft, and the screw constitutes a portion of the control member and extends through the hollow shaft; and control means for activating the electric motor in such a manner as to permanently maintain the axial operating pressure exerted on the control member below a given preset value.

BRIEF DESCRIPTION OF THE DRAWING

A non-limiting embodiment of the present invention will be described with reference to the accompanying drawing in which:

The sole FIGURE illustrates a partially-sectioned view of a clutch system according to the teachings of the present invention.

DETAILED DESCRIPTION OF THE INVENTION

Number 1 in the FIGURE indicates a power clutch system especially suitable for vehicles in general and, in particular, for motor vehicles.

System 1 comprises a control member 2 consisting of a flexible cable 3 subjected to pull by means of a pedal (not shown) and mounted in sliding manner inside a sheath 4, one end of which is secured to a supporting bracket 5 integral with a fixed supporting plate 6.

One end of cable 3 projects from the end of sheath 4 connected to bracket 5, and is fitted with a terminal 7, in turn, hinged, by means of pin 8, to one end of a control member 9 of clutch device 10. Device 10 has an external control lever 11 having, on its free end, a fork 12 engaged with terminal 13 integral with the end of control member 9 opposite the end engaged by pin 8.

Lever 11 is designed to move, subsequent to pull being exerted on control member 9, from the normal engaged position shown in the FIGURE, to a released position (not shown). At least an intermediate portion of control member 9 consists of a screw 14 connected, via the interposition of balls, to a nut screw 15.

On system 1, screw 14 may be rigid, employing a pinned connection between the nut screw 15 and the lever 11, or flexible and consists of a precompressed helical spring, as shown.

Screw 14 and nut screw 15 constitute a recirculating-ball coupling 16 connecting member 9 to a power drive unit 17 comprising an electric motor 18 having a hollow shaft. Motor 18 has a central, tubular output shaft 19 coaxial and integral with nut screw 15 and fitted through with screw 14, and comprises a rotor 20 coaxial and integral with shaft 19, and a stator 21 integral with a casing 22 which, in turn, is integrally connected with plate 6 by means of bracket 23, and forms part of tubular casing 24 which protects control member 9.

In addition to coupling 16 and motor 18, power drive unit 17 also comprises a control unit 25, in turn, comprising a known type of pull measuring device 26 available on the market; which device 26 is connected to member 9 and designed to emit an electric signal proportional to the absolute value of the pull exerted on cable 3. Unit 17 also comprises an adjustable-output threshold regulator 27, and a threshold comparator 28 having a first input for receiving an adjustable threshold signal emitted by regulator 27, a second input for receiving the signal emitted by device 26, and an output controlling the opening and closing of switch 29 of circuit 30 supplying motor 18.

In actual use, the pull exerted by the user on cable 3 and transmitted by the latter to control member 9 is measured continuously by device 26, the electric output signal of which, proportional to the pull, is received by threshold comparator 28 and compared continuously with a threshold or reference signal emitted by threshold regulator 27.

When the threshold signal exceeds the signal from device 26, no signal is emitted by comparator 28, and switch 29 remains in the normal open position. In this case, if relatively weak pull is exerted by the user on cable 3, i.e. if the signal emitted by device 26 is below the threshold signal but other than zero, control member 9 is displaced axially directly by cable 3, so as to turn nut screw 15 and rotor 20 via coupling 16.

When, on the other hand, the signal from device 26 exceeds the threshold signal, comparator 28 emits a signal, which closes switch 29 and activates motor 18. In this case, the action of the user on cable 3 is accompanied by the action of motor 18 which, by turning nut screw 15, causes axial displacement of screw 14 towards bracket 5 and rotation of lever 11 into the released position.

As soon as the user reduces the pull on cable 3 to below a given preset value, which may be regulated in known manner by means of regulator 27, switch 29 is opened so as to shut down motor 18.

Coupling 16 is appropriately reversible, i.e. a coupling whereby rotation of nut screw 15 is accompanied by displacement of screw 14, and axial displacement of screw 14 is accompanied by rotation of nut screw 15. Consequently, when cable 3 is released by the user, the pressure exerted by the return springs (not shown) on clutch device 10 causes backward displacement of control member 9, which is accompanied by idle rotation of rotor 20 and cable 3 returning to its normal position as shown in the FIGURE.

The advantages of clutch system 1 will be clear from the foregoing description. In addition to presenting an extremely straightforward structure, mainly due to employing motor 18 having a hollow shaft coaxial with control member 9, it is also extremely cheap to produce, by virtue of recirculating-ball coupling 16 acting as an epicyclic reduction gear, thus enabling the employment of relatively cheap, low-power, high-speed electric motors.

What is claimed is:

1. A power clutch system for vehicles, in particular for motor vehicles, comprising a clutch device having a control lever designed to move between two operating positions corresponding respectively to engagement and release; a control member connected to said lever and designed to move back and forth axially under the influence of an externally applied axial operating pressure for moving said lever between said two operating positions; and a power drive unit connected to said control member; characterized by the fact that said power drive unit comprises an electric motor with a hollow shaft; a screw-nut screw coupling on which said nut screw is integral with said hollow shaft and said screw constitutes a portion of said control member and extends through said hollow shaft; and, control means for activating said electric motor in such a manner as to permanently maintain the axial operating pressure exerted on said control member below a given preset value.

2. A system as claimed in claim 1, characterised by the fact that said screw-nut screw coupling is a recirculating-ball coupling.

3. A system as claimed in claim 1, characterised by the fact that it also comprises an actuating member comprising a flexible cable connected to said control member.

4. A system as claimed in claim 3, characterised by the fact that said screw is a flexible screw subjectable to pull, for displacing said lever from said engaged to said released position.

5. A system as claimed in claim 4, characterised by the fact that said flexible screw consists of a precompressed spring.

6. A system as claimed in claim 1, characterised by the fact that said control means comprise an axial stress measuring device connected to said control member and designed to supply an electric output signal proportional to the measured stress; and a threshold comparator for receiving the electric signal and activating said motor when the stress exceeds the given preset value.

7. A system as claimed in claim 6, characterised by the fact that it comprises a switch controlling a circuit supplying said motor; said comparator being designed to close said switch when the stress exceeds the given preset value.

8. A system as claimed in claim 6, characterised by the fact that an adjustable-output threshold regulator is connected to said comparator.

* * * * *